No. 858,424. PATENTED JULY 2, 1907.
E. B. STIMPSON.
TIRE PROTECTOR.
APPLICATION FILED MAR. 12, 1907.
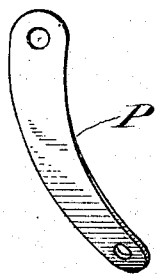
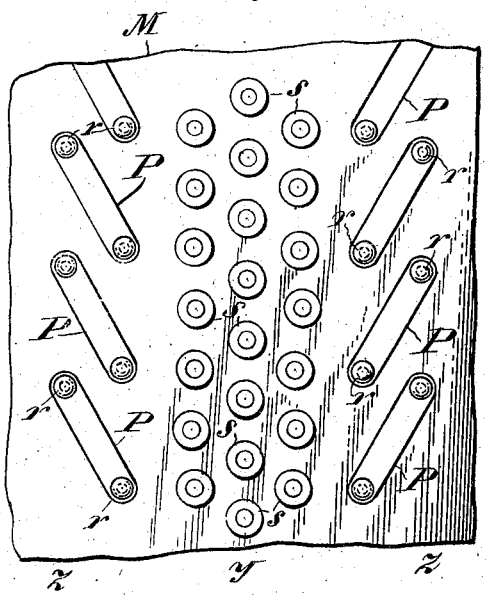
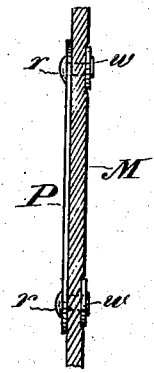
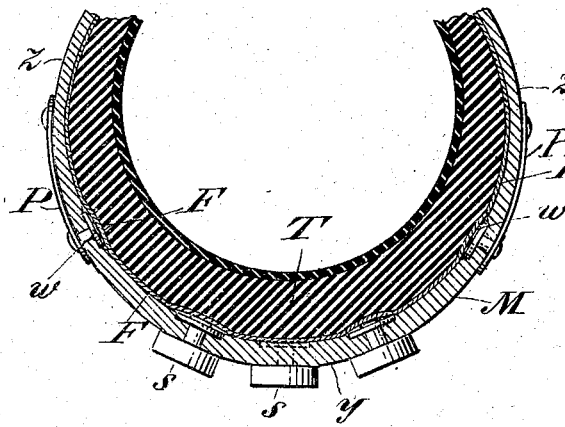
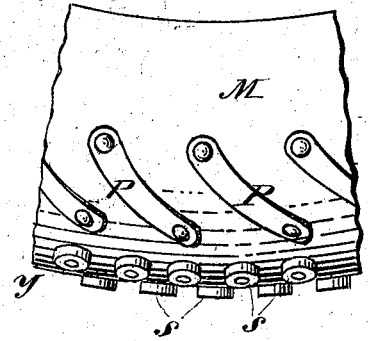
Witnesses
Frederick P Randolph
Jos. F. O'Brien
Edwin Ball Stimpson
Inventor
By his Attorney E W Scherr Jr

UNITED STATES PATENT OFFICE.

EDWIN BALL STIMPSON, OF NEW YORK, N. Y.

TIRE-PROTECTOR.

No. 858,424.　　　Specification of Letters Patent.　　　Patented July 2, 1907.

Application filed March 12, 1907. Serial No. 362,045.

*To all whom it may concern:*

Be it known that I, EDWIN BALL STIMPSON, a citizen of the United States, residing in the borough of Brooklyn, county of Kings, city and State of New York, have invented certain new and useful Improvements in Tire-Protectors, of which the following is a specification.

My present invention relates to protectors for tires, including pneumatic tires, of automobiles and other vehicles. These protectors are disposed along the sides of the tire to give protection against the abrasion and rough usage which tires receive from contact with bad roads, stones, or other objects in the road, and with the curbs in our city streets. The protectors are secured to the tire in a special way so that the natural resilient action of the tire will not cause them to tear out of the tire at the points where they are secured thereto. This is an important feature. In addition my protectors can be adapted to give very complete protection to the tire and are cheap to manufacture, and easily applied. The protectors may be secured directly to the tire, or to a cover separate from the tire but attachable thereto by suitable means, as for instance by straps.

One of the specific forms which my invention may take is illustrated in the accompanying drawings, in which, Figure 1 is a view of a fragment of a tire, seen flat, having metal studs protecting the tread of the tire and protecting strips within my present invention on each side of said studs: Fig. 2 is a cross section of a tire with its top portion broken away, showing in elevation the studs on the tread of the tire and the protectors on the sides: Fig. 3 is a side perspective view of the same tire on a reduced scale; Fig. 4 is a view of one of the protectors detached; Fig. 5 is an edge view of a fragment of material with a protector shown secured thereto.

Describing now the specific embodiments of my invention illustrated, the protectors P take the form of metal strips attached by two points of connection, one at each end, with the outside covering of the tire which may be of leather or other suitable material. The securing means between the protectors and the tire-covering M takes the form of rivets $r$, the heads of which abut against the protectors and the shanks of which extend more or less loosely through holes or eyes in the ends of the protectors and thence through the covering M where they are riveted against washers $w$. This form of connection it will be noted permits the protectors to swing or pivot more or less freely about the points of connection; in other words, the protectors can move or slide over the surface of the covering to any extent demanded by the resiliency of the tire.

The two points of connection between each protector and the covering are so located that they are not in line with the center of the wheel, in other words they are non-radial. Consequently when the tire compresses at the bottom due to the weight of the vehicle, the two points of connection between the protector at this point and the tire being on an oblique line and not on a vertical or radial line, the compression of the tire cannot act to tear out the rivets, but simply causes the lower end of the protector to swing upward to the extent of the compression of the tire. Similarly the provision of only two points of connection between each protector and the tire coupled with the further provision that said points of connection are non-radial to the wheel, destroys any possible leverage of the pulls and thrusts on the rivet connections between the protectors and the tire in all parts of the wheel to tear out the rivets, by converting the same everywhere into a harmless indirect thrust or pull on the rivets which can expend itself in causing the connectors merely to pivot on the tire instead of tearing out the rivet or other connections.

The protectors will preferably be given a permanent set or warp to correspond with the rotundity of the tire. This is intended to be illustrated in Figs. 2, 3, and 4. They may be placed close together consistent with the necessary clearance between them to permit their play upon the surface of the tire to conform to its resiliency.

The protectors may be of various shapes and sizes and may be disposed in a variety of positions upon the tire. The important feature is that the points of connection for each protector with the tire shall not be radial with respect to the wheel thereby avoiding a direct, non-pivotal tearing thrust or pull on the connections.

The protectors may be used in connection with studs $s$ applied to the tread of the tire. The heads of these studs receive the wear and their shanks project through the covering M of the tire where they are riveted on the inside against suitable washers.

By the expression "sides of the tire" is intended those portions above the tread or normal contact surface of the tire with a level road.

Having thus described my invention what I claim is:

1. In combination a tire and protectors on the sides of said tire, each secured thereto at two points non-radial to the wheel.

2. In combination a tire and protectors on the sides of said tire, each pivotally secured thereto at two points non-radial to the wheel.

3. In combination a tire and protectors on the sides of said tire each pivotally secured thereto at two points non-radial to the wheel and conforming to the rotundity of the tire.

4. In combination a tire and elongated protecting plates each secured non-radially on the sides of the tire by a point of connection at each end.

5. In combination with a tire, flexible material adapted to be attached thereto and protectors on said flexible material which are located at the sides of the tire when the flexible material is attached to the tire and each of which is secured to said material at two points non-radial to the wheel.

6. In combination a tire, studs on the tread of said tire, and protectors on the sides of the tire each secured thereto at two points non-radial to the wheel.

In witness whereof I have signed my name to the foregoing specification in the presence of two subscribing witnesses.

EDWIN BALL STIMPSON.

Witnesses:
H. R. BAUER,
JOS. F. O'BRIEN.